(12) United States Patent
Mohan et al.

(10) Patent No.: US 8,994,295 B2
(45) Date of Patent: Mar. 31, 2015

(54) COMMISSION OF DISTRIBUTED LIGHT FIXTURES OF A LIGHTING SYSTEM (71) Applicants: Tanuj Mohan, Mountain View, CA (US); Premal Ashar, Sunnyvale, CA (US); Saurabh Gupta, Sunnyvale, CA (US)

(72) Inventors: Tanuj Mohan, Mountain View, CA (US); Premal Ashar, Sunnyvale, CA (US); Saurabh Gupta, Sunnyvale, CA (US)

(73) Assignee: enLighted, Inc., Sunnyvale, CA (US)

( * ) Notice: Subject to any disclaimer, the term of this patent is extended or adjusted under 35 U.S.C. 154(b) by 365 days.

(21) Appl. No.: 13/691,562

(22) Filed: Nov. 30, 2012

(65) Prior Publication Data
US 2013/0088168 A1 Apr. 11, 2013

Related U.S. Application Data (63) Continuation-in-part of application No. 12/874,331, filed on Sep. 2, 2010, now Pat. No. 8,587,225, which is a continuation-in-part of application No. 12/584,444, filed on Sep. 5, 2009, now Pat. No. 8,457,793.

(51) Int. Cl.
H05B 37/00 (2006.01)
G05B 15/02 (2006.01)
H05B 37/02 (2006.01)
G01S 5/00 (2006.01)

(52) U.S. Cl.
CPC .............. G05B 15/02 (2013.01); H05B 37/02 (2013.01); H05B 37/0245 (2013.01); G01S 5/0027 (2013.01)
USPC ........................... 315/318; 315/301; 315/316

(58) Field of Classification Search
USPC .......... 315/294, 299, 301, 307–308, 316–318
See application file for complete search history.

(56) References Cited

U.S. PATENT DOCUMENTS

| 5,101,141 | A | 3/1992 | Warner et al. |
| 5,179,324 | A | 1/1993 | Audbert |
| 5,191,265 | A | 3/1993 | D'Aleo et al. |
| 5,283,516 | A | 2/1994 | Lohoff |
| 5,812,422 | A | 9/1998 | Lyons |
| 6,057,654 | A | 5/2000 | Cousy et al. |
| 6,188,181 | B1 | 2/2001 | Sinha et al. |
| 6,342,994 | B1 | 1/2002 | Cousy et al. |
| 6,548,967 | B1 | 4/2003 | Dowling et al. |
| 7,309,985 | B2 | 12/2007 | Eggers et al. |
| 7,348,736 | B2 | 3/2008 | Piepgras et al. |
| 7,382,271 | B2 | 6/2008 | McFarland |
| 7,437,596 | B2 | 10/2008 | McFarland |
| 7,550,931 | B2 | 6/2009 | Lys et al. |
| 7,566,137 | B2 | 7/2009 | Veskovic |
| 7,623,042 | B2 | 11/2009 | Huizenga |
| 7,792,956 | B2 | 9/2010 | Choong et al. |
| 7,925,384 | B2 | 4/2011 | Huizenga et al. |
| 8,796,958 | B2 * | 8/2014 | Billig et al. .................. 315/363 |
| 2004/0002792 | A1 | 1/2004 | Hoffknecht |
| 2005/0169643 | A1 | 8/2005 | Franklin et al. |

(Continued)

Primary Examiner — An Luu
(74) Attorney, Agent, or Firm — Brian R. Short (57) ABSTRACT Apparatuses, methods, apparatuses and systems for commissioning a light fixture are disclosed. One method includes receiving, by the light fixture, a message from a central controller, wherein reception of the message puts the light fixture into a known condition, establishing communication between the light fixture and a user, and communicating, by either the light fixture or the user, a location of the user at a time of the established communication, to the central controller, thereby allowing the central controller to record a location of the light fixture.

20 Claims, 6 Drawing Sheets

(56) References Cited

U.S. PATENT DOCUMENTS

| | | |
|---|---|---|
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0086128 A1 | 4/2007 | Lane et al. |
| 2007/0215794 A1 | 9/2007 | Cernasov et al. |
| 2008/0185977 A1 | 8/2008 | Veskovic et al. |
| 2008/0244104 A1 | 10/2008 | Clemente |
| 2008/0265796 A1 | 10/2008 | Null |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemel et al. |
| 2010/0270933 A1 | 10/2010 | Chemel et al. |
| 2010/0295482 A1 | 11/2010 | Chemel et al. |
| 2010/0301773 A1 | 12/2010 | Chemel et al. |
| 2011/0031897 A1 | 2/2011 | Henig et al. |
| 2011/0199020 A1 | 8/2011 | Henig et al. |
| 2012/0293075 A1* | 11/2012 | Engelen et al. ............... 315/151 |
| 2015/0008831 A1* | 1/2015 | Carrigan et al. .............. 315/153 |

* cited by examiner

COMMISSION OF DISTRIBUTED LIGHT FIXTURES OF A LIGHTING SYSTEM

RELATED APPLICATIONS

This patent application is a continuation-in-part (CIP) of U.S. patent application Ser. No. 12/874,331 filed Sep. 2, 2010, which is a continuation-in-part (CIP) of U.S. patent application Ser. No. 12/584,444 filed Sep. 5, 2009, which are herein incorporated by reference.

FIELD OF THE EMBODIMENTS

The described embodiments relate generally to lighting. More particularly, the described embodiments relate to commissioning of light fixtures of a lighting system.

BACKGROUND

Lighting control systems automate the operation of lighting within a building or residence based upon, for example, preset time schedules and/or occupancy and/or daylight sensing. The Lighting systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Typically, lighting systems receive the sensor signals at a central lighting controller.

The lighting systems are advantageous because they typically reduce energy costs by automatically lowering light levels or turning off devices and appliances when not needed, and they can allow all devices in the system to be controlled from one location.

Centrally controlled lighting systems can be disadvantageous because all decision making occurs at the controller. Therefore, if the controller becomes inoperative, all lighting devices in the system are no longer under automated control and some or all may not operate even manually. Similarly, if a connection to or from the controller is severed, the lighting devices served by that connection are no longer under automated control and also may not operate manually. Partial or system-wide functional changes, such as an immediate need to override current system settings (for example, during a fire or other emergency), cannot be made from anywhere but the controller. Additionally, centrally-controlled systems are limited in their ability to be scaled. That is, it is not easy to add new lighting devices to a centrally-controlled system.

Decentralized lighting systems address many of the above-described issues. However, decentralized lighting systems require commissioning of lighting devices associated with the lighting systems.

Commissioning is the process of configuring the lighting system. This includes configuring the initial settings on these lighting devices, and obtaining and storing information about the physical location of the devices and their role in the lighting control topology.

It is desirable to have a method, system and apparatus for commissioning of light fixtures of a lighting system.

SUMMARY

One embodiment includes a method of commissioning a light fixture. The method includes receiving, by the light fixture, a message from a central controller, wherein reception of the broadcast message puts the light fixture into a known condition, establishing communication between the light fixture and a user, and communicating, by either the light fixture or the user, a location of the user at a time of the established communication, to the central controller, thereby allowing the central controller to record a location of the light fixture.

Another embodiment includes a light fixture. The light fixture includes a light and a controller, wherein controller is interfaced with the light, and the controller is operative to receive a message from a central controller, wherein reception of the message puts the light fixture into a known condition. Further, the controller is operative to establish communication between the light fixture and a user. At least one of the controller or the user communicates a location of the user at a time of the established communication, to the central controller, thereby allowing the central controller to record a location of the light fixture.

Another embodiment includes a lighting system. The lighting system includes a plurality of light fixtures, and a central controller, wherein the central controller is operable to communicate with each of the plurality of light fixtures. Each light fixture includes a light and a controller, wherein controller is interfaced with the light, and the controller is operative to receive a message from a central controller, wherein reception of the message puts the light fixture into a known condition. Further, the controller is operative to establish communication between the light fixture and a user. At least one of the controller or the user communicates a location of the user at a time of the established communication, to the central controller, thereby allowing the central controller to record a location of the light fixture.

Other aspects and advantages of the described embodiments will become apparent from the following detailed description, taken in conjunction with the accompanying drawings, illustrating by way of example the principles of the described embodiments.

DETAILED DESCRIPTION

As shown in the drawings, the described embodiments are embodied in an apparatus and method for commissioning of light fixtures of a lighting system. Additionally, embodiments include commissioning of other devices of the lighting system, such as, gateways and switches.

Figure 1:
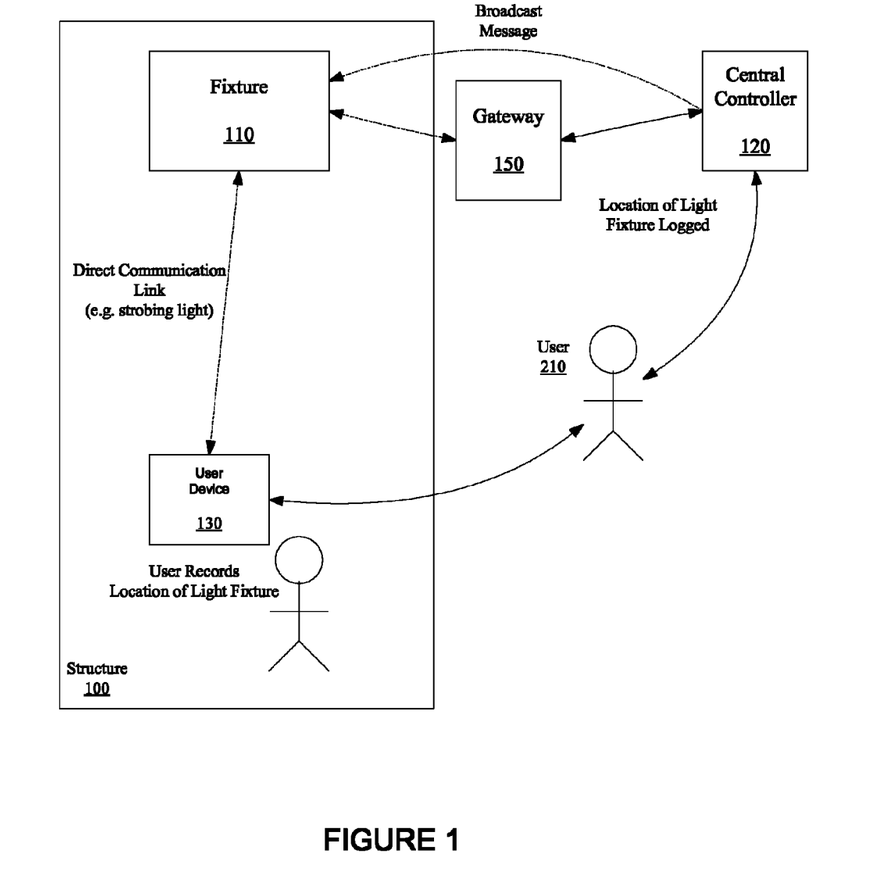
FIG. 1 shows a user commissioning a light fixture of a lighting control system, according to an embodiment.

FIG. 1 shows a user commissioning a light fixture 110 of a lighting control system, according to an embodiment. For at least some embodiments, a user 210 travels about a structure 100 and communicates (through a user device 130) with light fixtures (such as, light fixture 110) within the structure. The user 210 or the user device 130 identifies a location of the user device 130 at the time the user device 130 or the user 210 is communicating with the light fixtures. For at least some embodiments, during communication with the light fixture 130, the user 210 and the user device 130 are located physically proximate to the light fixture 130. Therefore, a location of the light fixture 130 can be approximated by the location of the user 210 and/or the user device 130. Once determined or approximated, the location of the light fixture 110 can be communicated to a central controller 120, wherein the central controller 120 logs the location of the light fixture 130 for future reference.

The described embodiments include various different embodiments of the central controller. For an embodiment, the central controller is a standalone server. For another embodiment, the central controller is a mobile device that can be carried and transported by the user. For yet another embodiment, the central controller is a mobile device that can be carried by the user, and additionally synchronized to another central controlling device. For another embodiment, the gateway 150 and central controller 120 are combined in a single device that includes the functionality of both. For another embodiment, the central controller is included within one or more of the fixtures. That is, the controller can be included within a single fixture, or the functionality of the controller can be distributed among controllers within multiple of the fixtures.

For at least some embodiments, the commissioning process begins with the central controller 120 broadcasting a message that is received by one or more light fixtures, such as, light fixture 110. As shown, for an embodiment, the central controller 120 communicates with the light fixture 110 through a gateway 150. The communication channel between the central controller 120 and the gateway 150 can be wired or wireless. For an embodiment, the communication channel is an Ethernet connection. Further, the communication channel between the gateway 150 and the light fixture can be wired or wireless. Note for other embodiments, the commissioning process can be initiated by the fixture themselves.

For an embodiment, reception of the broadcast puts the light fixture 110 into a predetermined or known mode of operation. For an embodiment, reception of the broadcast message puts the light fixture 110 in the known condition, thereby communicating to the user that the light fixture 110 is prepared for commissioning. Once ready for commissioning, communication between the user 210 or the user device 130 and the light fixture, can be completed. For an embodiment, reception of the broadcast message causes the light fixture to power cycle and dim, and further, to report a sensed light levels corresponding with the power cycling.

When the light fixture 110 is prepared for communication, the user device 130 establishes communication with the light fixture. For an embodiment, the communication is initiated by a light emitting device of the user 210 that generates pulses (strobes) of light. A light sensor of the light fixture 110 sensing the pulsing light, and then communicates back to the user 210 that communication from the user 210 has been received. For an embodiment, the light fixture 110 communicates to the user with a visible (such as a light) indicator. While this embodiment include communicating between the mobile device 130 (or user 110) being accomplished through light, it is to be understood that any method of communication can be used, including, but not limited to audio, motion and/or electromagnetic communication. The communication provides a means for establishing the location of the light fixture based on a location of the user/user device.

Once the location of the light fixture 110 has been determined or estimated, the location of the light fixture 110 is communicated to the central controller 120. For an embodiment, the user 210 physically enters the location into the central controller 120. For another embodiment, the user device 130 automatically updates the central controller 120. For another embodiment, the light fixture 110 obtains its location information, and updates the central controller. For another embodiment, the central controller 120 and the user device 130 are the same device which automatically updates its own light fixture data base.

The location information can be determined in a number of ways. The user 210 may know where he/she is located within the structure. For an embodiment, the user device 130 includes a global positioning system (GPS) receiver and automatically determines its location. For at least some embodiments, the user device 130 determines its location by triangulating received radio frequency (RF) signal from, for example, WiFi routers located proximate to the user device 130. By knowing the locations of the WiFi routers, the user device can approximate its location based on the know locations and a received signal strength of the RF signals of the WiFi routers.

Figure 2:
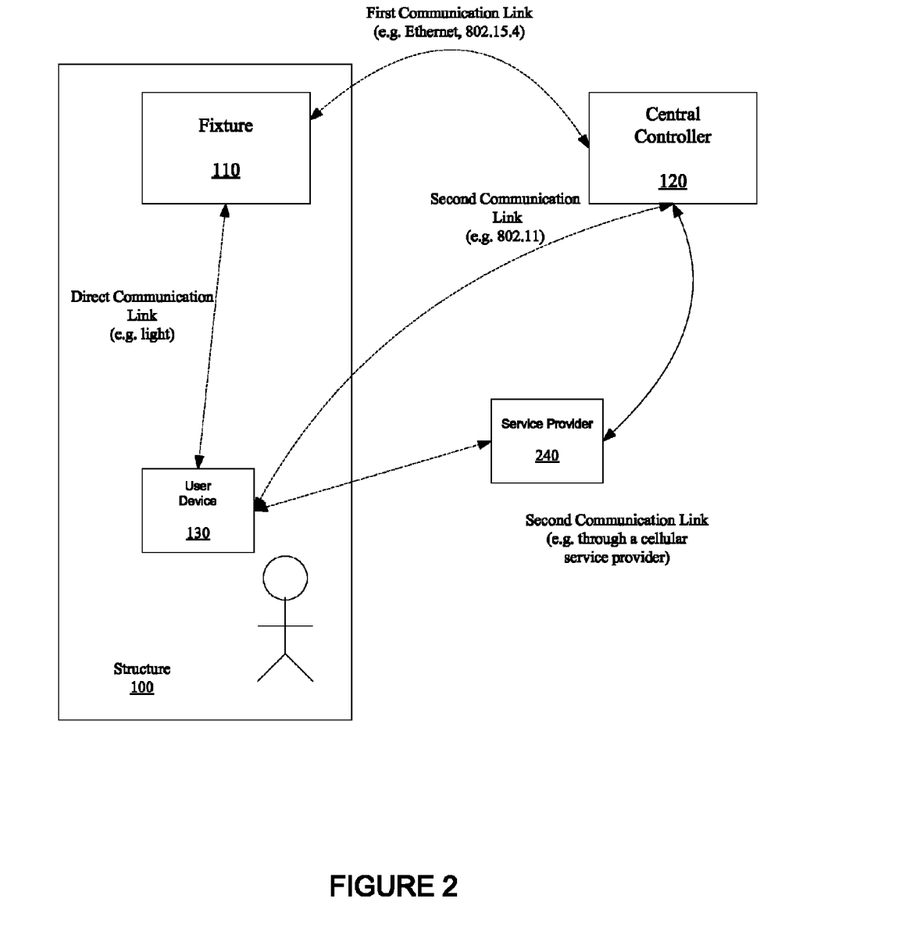
FIG. 2 shows a user commissioning a light fixture of a lighting control system, according to another embodiment.

FIG. 2 shows a user commissioning the light fixture 110 of a lighting control system, according to another embodiment. For this embodiment, a first communication link is established between the central controller 120 and the light fixture 110, and a second communication link is established between the user device 130 and the central controller 120. For an embodiment, the second communication link includes a direct WiFi (802.11) wireless link. For another embodiment, the second communication link includes an indirect link through a service provider 240. That is, for example, the user device 130 can establish a wireless (such as, cellular) link to the service provider 240. The service provider 240 is then network connected to the central controller 120.

Figure 3:
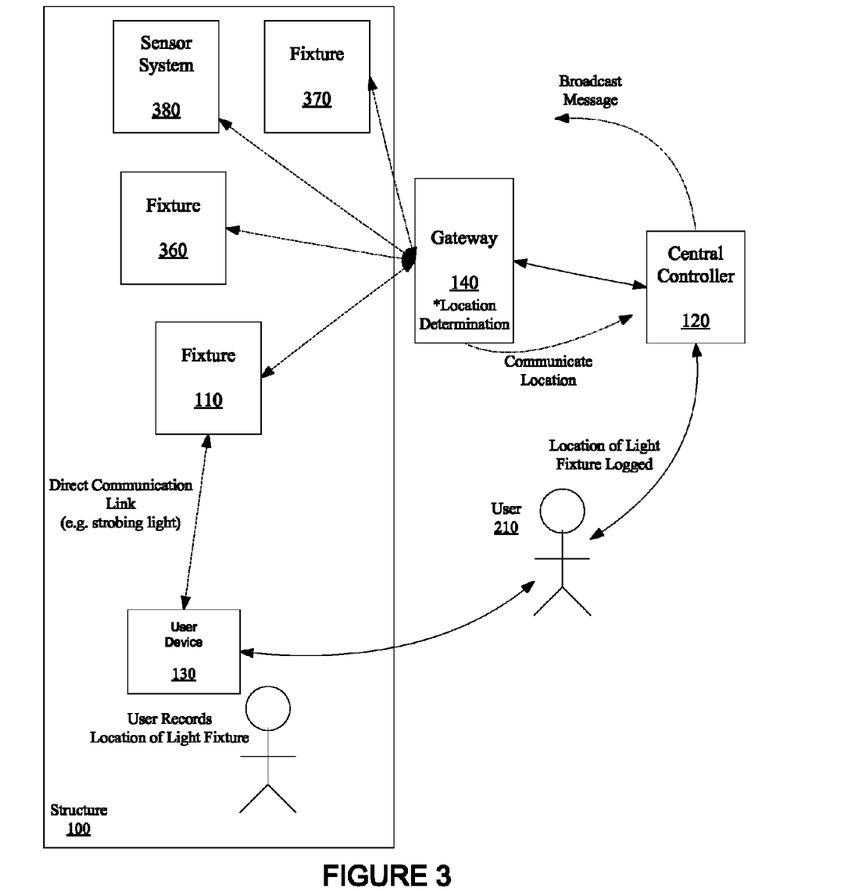
FIG. 3 shows a commissioning a gateway of a lighting control system, according to an embodiment.

FIG. 3 shows a commissioning a gateway of a lighting control system, according to an embodiment. The embodiments for commissioning a light fixture can be extended to further include commissioning of other devices of the lighting system, such as, gateways (such as, gateway 140), sensors (such as, sensor system 380), which can themselves by standalone devices, and switches.

For an embodiment, the gateway includes a simple pass through device that just converts from one communication medium to the other. For a specific embodiment, the gateway converts messages from the IEEE 802.15.4 standard to the IEEE 802.11 standard.

For various embodiments, the switches include any of one or more control devices, such as, a wall switch, a desktop remote, a cell phone or tablet.

As shown in FIG. 3, several light fixtures 110, 360, 370 can determine their location utilizing the described embodiments. Further, the light fixtures 110, 360, 370 are in communication with, for example, a gateway 140. For at least some embodiments, after the light fixtures 110, 360, 370 and/or sensor system 380, have determined their location, the light fixtures 110, 360, 370 and/or sensor system 380, transmit wireless messages that include their determined location. The gateway 140 receives the wireless messages, and is able to approximate its location by triangulating based on the locations of the light fixtures 110, 360, 370. That is, based on a received signal strength of the received wireless signals, the gateway 140 can approximate its distance from each of the light fixtures 110, 360, 370. Further, based on the location of each light fixture 110, 360, 370 and/or sensor system 380, included within the received wireless messages, the gateway 140 can approximate its own location.

While FIG. 3 only shows a single gateway 140, other embodiments include any number of gateways. The embodiments for location determination can be used for commissioning the gateways. Further, embodiments include gateway discovery, wherein the central controller provides one or more gateways with IP addresses. Further, for at least some embodiments, the location determination of each of the gateways includes each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture.

Alternatively, or additionally, other lighting system devices can be commissioned, and determine their location as well.

The sensor system 380 (which can be an embodiment of the smart sensor sytem 402 of FIG. 4) can be utilized to provide additional information. For example, unlike the light fixtures 110, 360, 370, the sensor system can be strategically located within a structure. For example, the sensor system 380 may include a temperature sensor. By locating the sensor system 380 at a location within the structure that more closely approximates the temperature within the structure where occupants are located, the temperature sensed by the sensor system 380 more accurately represents the temperature that the occupants are subject to. That is, the light fixtures 110, 360, 370 are typically located on a ceiling of the structure which does not allow for an accurate representation of the temperature within the structure that occupants are experiencing.

Figure 4:
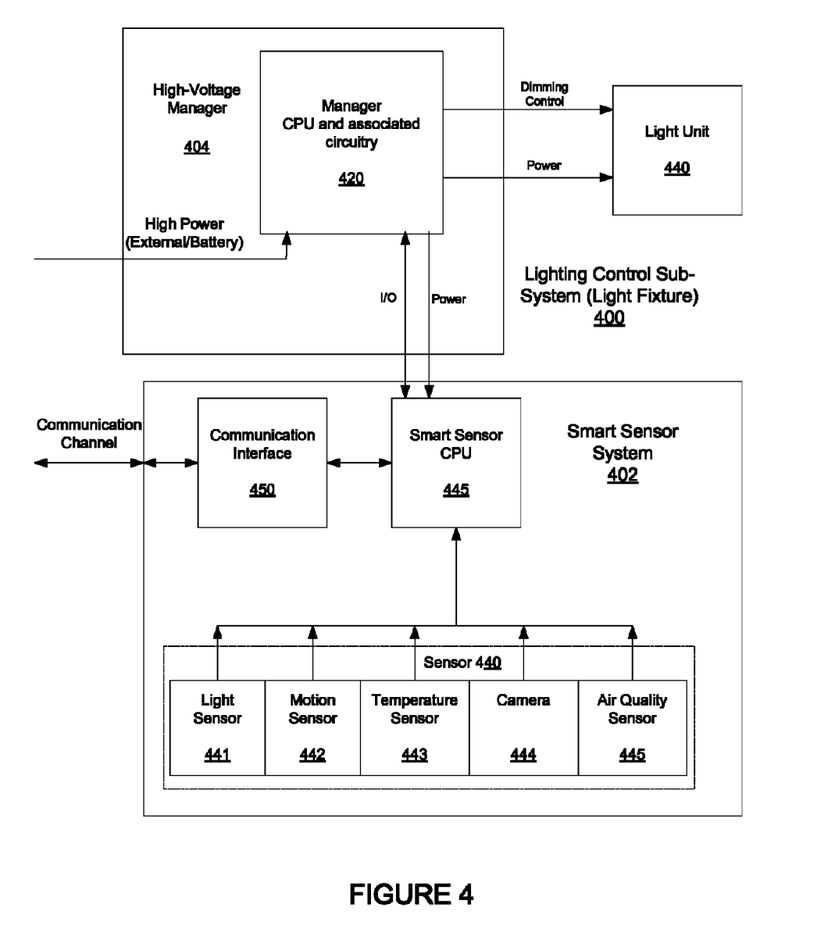
FIG. 4 shows a light fixture, according to an embodiment.

FIG. 4 shows a light fixture, according to an embodiment. The exemplary light fixture 400 (which could alternatively by referred to as lighting control subsystem because of the multiple controls) includes a smart sensor system 402 that is interfaced with a high-voltage manager 404, which is interfaced with a luminaire 440. The high-voltage manager 404 includes a controller (manager CPU) 420 that is coupled to the luminaire 440, and to a smart sensor CPU 435 of the smart sensor system 102. As shown, the smart sensor CPU 145 is coupled to a communication interface 450, wherein the communication interface 450 couples the controller to an external device. The smart sensor system 402 additionally includes a sensor 440. As indicated, the sensor can include one or more of a light sensor 441, a motion sensor 442, and temperature sensor 443, and camera 444 and/or an air quality sensor 445. It is to be understood that this is not an exhaustive list of sensors. That is additional or alternate sensors can be utilized for lighting and/or environmental control of a structure that utilizes the lighting control sub-system 400. The sensor 440 is coupled to the smart sensor CPU 445, and the sensor 440 generates a sensed input. For at least one embodiment, at least one of the sensors is utilized for communication with the user device.

According to at least some embodiments, the controllers (manager CPU 420 and the smart sensor CPU) are operative to control a light output of the luminaire 440 based at least in part on the sensed input, and communicate at least one of state or sensed information to the external device.

For at least some embodiments, the high-voltage manager 404 receives the high-power voltage and generates power control for the luminaire 440, and generates a low-voltage supply for the smart sensor system 402. As suggested, the high-voltage manager 404 and the smart sensor system 402 interact to control a light output of the luminaire 440 based at least in part on the sensed input, and communicate at least one of state or sensed information to the external device. The high-voltage manager 404 and the smart sensor system 402 can also receive state or control information from the external device, which can influence the control of the light output of the luminaire 440. While the manager CPU 420 of the high-voltage manager 404 and the smart sensor CPU 445 of the smart sensor system 402 are shown as separate controllers, it is to be understood that for at least some embodiments the two separate controllers (CPUs) 420, 445 can be implemented as single controller or CPU.

For at least some embodiments, the communication interface 450 provides a wireless link to external devices (for example, the central controller, the user device and/or other lighting sub-systems or devices).

An embodiment of the high-voltage manager 404 of the lighting control sub-system 400 further includes an energy meter (also referred to as a power monitoring unit), which receives the electrical power of the lighting control sub-system 400. The energy meter measures and monitors the power being dissipated by the lighting control sub-system 400. For at least some embodiments, the monitoring of the dissipated power provides for precise monitoring of the dissipated power. Therefore, if the manager CPU 420 receives a demand response (typically, a request from a power company that is received during periods of high power demands) from, for example, a power company, the manager CPU 420 can determine how well the lighting control sub-system 400 is responding to the received demand response. Additionally, or alternatively, the manager CPU 420 can provide indications of how much energy (power) is being used, or saved.

Figure 5:
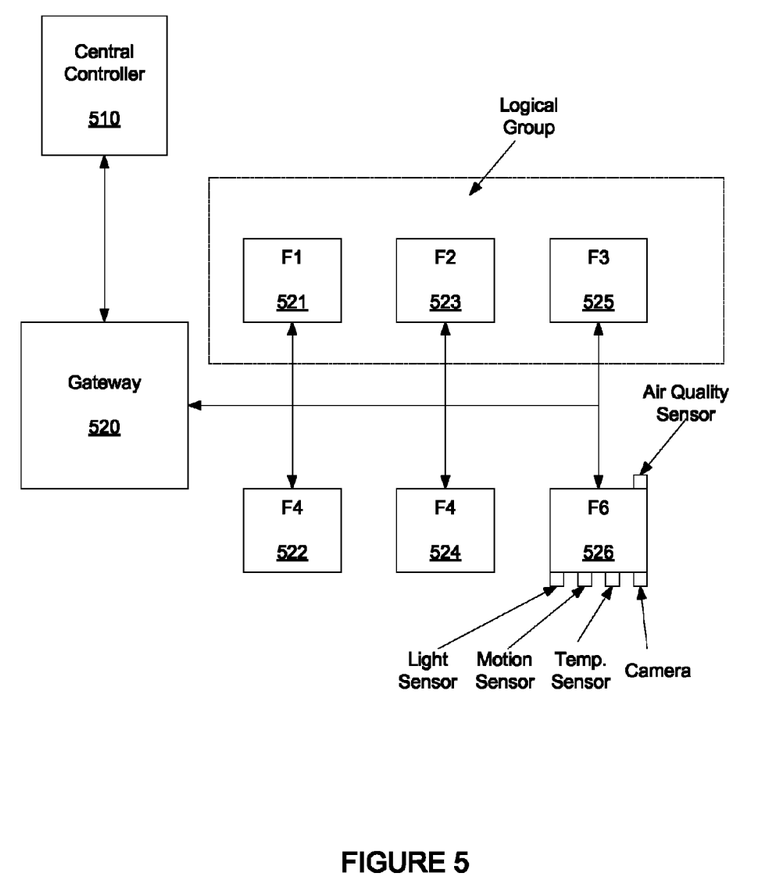
FIG. 5 shows a distributed lighting control system that includes that includes a logical group of light fixtures and a central controller, according to an embodiment.

FIG. 5 shows a distributed lighting control system that includes that includes a logical group of light fixtures 521, 522, 523, 524, 525, 526 and a central controller 510, according to an embodiment. As described, for an embodiment, the central controller 510 can communicate with the light fixtures 521, 522, 523, 524, 525, 526 through a gateway 520. At least some embodiments of the lighting control system include a plurality of the lighting control sub-system (each lighting control sub-system can include a light fixture). Each of the lighting control sub-systems can operate independently, in coordination with other lighting control sub-systems (for example, existing hard-wired systems), and/or in coordination with a central controller. As such, each of the lighting control sub-systems can be independently installed, and adapt their operation accordingly.

As shown, the light fixtures 521, 522, 523, 524, 525, 526 can be organized, or they can organize themselves into logical groups. Once included as a part of a logical group, a light fixture can be controlled based on state or sense information of other light fixtures within the logical group. Additionally, the logical group can be commonly controlled. For an embodiment, at least one of the logical groups includes a motion sensing group. For an embodiment, at least one of the logical groups includes an ambient light group. For an embodiment, at least one of the logical groups includes a logical switch group. For an embodiment, at least one of the logical groups includes a logical temperature group. Further, logical groups can be defined by attributes of a structure in which the light fixtures are located. For example, light fixture located within a hallway of a structure may be grouped, light fixtures within a conference room, a bath room or a storage room may be grouped into logical groups.

During commissioning, the logical groups can be auto-assigned based on information, like location, that is determined during commissioning. Group attributes can be selected based on location and type (like corridor, office). Based on the maps and known locations, logical groups can be intelligently and automatically allocated. Further, logical group formations can be influenced by the locations of the light fixtures determined during commissioning.

As previously stated, an embodiment of the lighting control sub-system includes a communication interface, a controller (listed in discussion as a single controller, but as previously described, at least some embodiment include multiple controllers, such as, the high-voltage manager 404 and the smart sensor CPU 445), a luminaire, a light sensor, and a motion sensor. For an embodiment, the luminaire is a lighting unit consisting of one or more lamps, socket(s) and parts that hold the lamp(s) in place and protect them, wiring that connects the lamp(s) to a power source, and reflector(s) to help direct and distribute the light. Various embodiments of luminaires include bulb technologies, such as incandescent, florescent, and LED (light emitting diode). Further, various embodiments of the luminaires are controllably turned on and off, and further, are controllably dimmable.

For at least some embodiments, the controller makes decisions as to turning on, turning off, and dimming the luminaires. The controller does this, for example, either due to command from an external device (such as, the central controller), or by processing decision rules using inputs from the sensors, a saved configuration, time of day, passage of time from past sensor inputs, and/or from state or sensor values from other sub-systems. Additionally or alternatively, learned behavior can influence the decisions.

For at least some embodiments, the sensors sense (or measures) some physical quantity and converts it into a digital value. For an embodiment, the sensors are packaged together with the controller. More specifically, for various embodiments of the lighting control sub-system, multiple sensors of the lighting control sub-system include a motion sensor, a light sensor, and temperature sensors located in the same physical module, which is connected to the other physical modules with a cable. For an embodiment, the sensor(s) are physically located beside the luminaire, and the motion and light sensors are directed towards the floor of a structure in which the lighting control sub-system is located. For an embodiment, the sensor(s) are directly connected to the controller.

For an embodiment, the controller is further operative to receive information from an external device, wherein the received information influences a current state of the lighting control sub-system, or the received information includes parameters that influence a future state of the lighting control sub-system. For an embodiment, the received information influences a lighting control sub-system profile. For an embodiment, the lighting sub-system profile includes a set of values (parameters) that affect the operation of the controller in determining how it controls the light output of the luminaire based on current and past sensor inputs, time of day or passage of time. For at least some embodiments, the parameters are adaptively updated.

For at least some embodiments, the controller is operative to receive a plurality of lighting control sub-system profiles. That is, there can be more than one lighting control sub-system profile, and the lighting control sub-system profiles can be adaptively updated. More specifically, an active profile or present profile of the plurality of lighting control sub-system profiles can be adaptively updated. Further, for at least some embodiments, the external device can add, replace or delete one or more profiles of the plurality of lighting control sub-system profiles.

Figure 6:
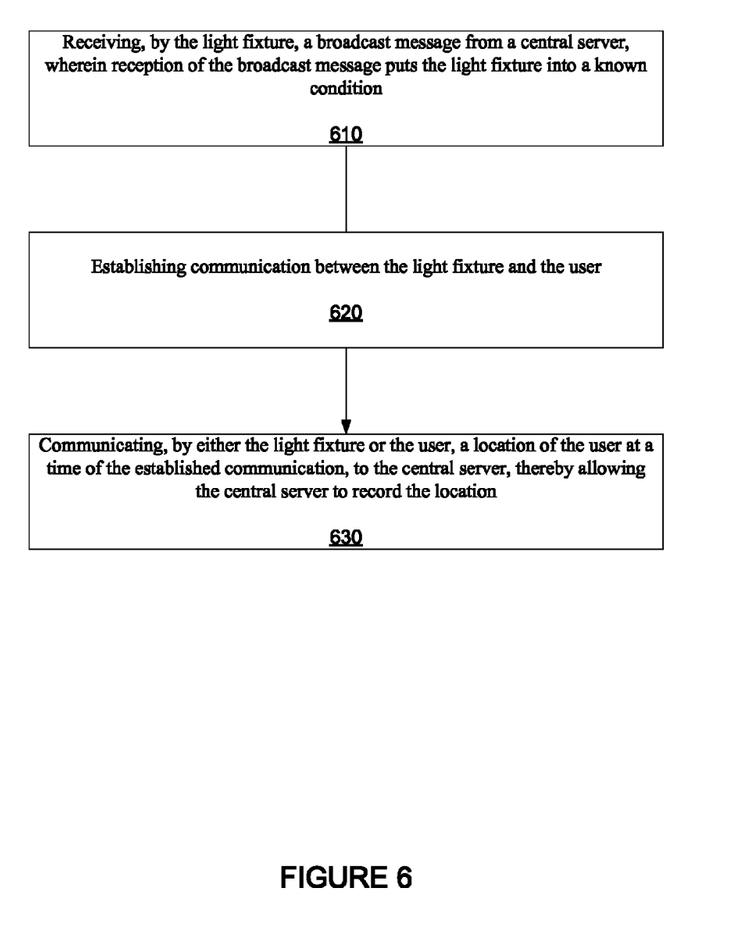
FIG. 6 is a flow chart that includes steps of a method of commissioning a light fixture, according to an embodiment.

FIG. 6 is a flow chart that includes steps of a method of commissioning a light fixture, according to an embodiment. A first step 610 includes receiving, by the light fixture, a broadcast message from a central controller, wherein reception of the broadcast message puts the light fixture into a known condition. A second step 620 includes establishing communication between the light fixture and a user. A third step 630 includes communicating, by either the light fixture or the user, a location of the user at a time of the established communication, to the central controller, thereby allowing the central controller to record a location of the light fixture.

As described, for an embodiment, putting the light fixture in the known condition communicates to the user that the light fixture is prepared for commissioning. The communication to the user can be visual, audible, or communicated to the user by any means available.

An embodiment further includes initiating diagnostics of the lighting system of the light fixture. That is, different lighting system devices can communicate with each other over different communication channels. Through this communication, the lighting system devices can run diagnostics to test, for example, that all the electrical wiring has been done correctly, the sensors are working correctly and the controllable systems (lights, etc.) are responding correctly.

For an embodiment, the light fixture is a part of a lighting system that includes other lighting system devices, such as, gateways and switches. An embodiment further includes determining a communication link quality between the light fixture and one or more lighting system devices. An embodiment further includes estimating a location of at least one of the lighting system devices based on the location of the light fixture and the communication link quality between the light fixture and the at least one lighting system device. An embodiment further includes estimating the location of the at least one lighting system device based on locations of a plurality of lighting fixtures, and link qualities between the at least one lighting system device and each of the plurality of lighting fixtures. That is, for example, triangulation between the lighting system device and the plurality of lighting fixtures can be used to estimate the location of the lighting system device.

An embodiment further includes discovering the one or more gateways, wherein discovery includes providing, by the central controller, the one or more gateways with IP addresses, and determining a location of each of the gateways, including each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture. For an embodiment, if multiple gateways receive the message, a signal quality of the message is used to determine which of the gateways is closest to the at least one light fixture, and therefore determines the location of the gateway that is the closest.

An embodiment includes sensing, by the light fixture, a presence of a user. For an embodiment, the presence of the user is sensed through a motion sensor.

For an embodiment, establishing the communication link includes the light fixture providing the user with an indicator that the light fixture has received an initial communication from the user. For an embodiment, the communication is established between the light fixture and the user through a strobing light. For an embodiment, the communication is established between the light fixture and the user through an RF signal, such as, 802.15.4 or Zigbee.

For an embodiment, establishing the communication between the light fixture and the user includes the light fixture modulation light emitting from the fixture with information that provides identification of the light fixture. That is, for example, for an embodiment, the light fixture is operative to modulate light emitted from the light fixture with information that uniquely identifies the light fixture. For example, the information can include a MAC (media access control) address or an IP (internet protocol) address of the light fixture. The user can have a user device in the user's possession that demodulates the modulated light, thereby providing the user device with the identification information of the light fixture. This information along with the location information of the light fixture can be communicated to the central controller, thereby allowing the central controller to log the identification information of the light fixture along with the location information of the light fixture.

An embodiment further includes the user communicating the location of the light fixture directly to the central controller. This communication can be one or more of several different forms. For an embodiment, the user directly enters the location information to the central controller. For another embodiment, the user communicates (for example, via mobile device to mobile device through either a cellular or WiFi network) the location information to a second user who manually enters the location. For an embodiment, the user wirelessly communicates the location information through a network that is connected to the central controller. Again, the wireless communication can be cellular or WiFi. As previously described, for an embodiment, the user device and the central controller are the same device. For another embodiment, the light fixture communicates the location of the light fixture directly to the central controller.

As previously described, an embodiment includes a plurality of other light fixtures automatically determining their location based on the location of the light fixture. That is, once locations of several light fixtures have been determine, these light fixtures and their location can be used to allow other fixtures to automatically determined their own locations based off of the reception of messages from the known-location light fixtures. For example, the other light fixtures can triangulate based on estimated distances between the other light fixtures and the known-location fixtures. The messages include the location of the known-location fixture, and the distance can be estimated based on the received signal strength of the messages.

An embodiment further includes a plurality of light fixtures, wherein each light fixture automatically establishing communication between the light fixture and the user as the user travels in a structure that includes the plurality of light fixtures, wherein each light fixture automatically determines its location based on the established communication. That is, for example, a user can merely "walk around" a structure. The light fixtures automatically communicate with a user device. The location of the user device can be automatically communicated to the light fixtures, allowing each light fixture to estimate their location. GPS within the user device can be used to determine the location of the user. The communication links between the user device and each light fixture can be established when the user device is within a predetermined proximate distance of the light fixture.

Maps or floor plans of a structure in which the light fixtures are located can be utilized to aid the automatic location determination and grouping process. The maps can be photos or graphical illustrations of the floor plan which highlight relative locations of the light fixtures. The mapped locations can be used to make the triangulation process more accurate. Once the location is determined through triangulation, a "snap-to-grid" process can be utilized to align the estimated location to the known fixture locations. The maps and determined locations can also be used to provide more information about space within the structure, for example, whether a space is an office, hallway, open area, etc.

Although specific embodiments have been described and illustrated, the described embodiments are not to be limited to the specific forms or arrangements of parts so described and illustrated. The embodiments are limited only by the appended claims.

What is claimed:

1. A method of commissioning a light fixture, comprising:
    receiving, by the light fixture, a message from a central controller, wherein reception of the broadcast message puts the light fixture into a known condition;
    establishing communication between the light fixture and a user; and
    communicating, by either the light fixture or the user, a location of the user at a time of the established communication, to the central controller, thereby allowing the central controller to record a location of the light fixture.

2. The method of claim 1, wherein putting the light fixture in the known condition communicates to the user that the light fixture is prepared for commissioning.

3. The method of claim 1, further comprising determining a communication link quality between the light fixture and one or more lighting system devices.

4. The method of claim 3, further comprising estimating a location of at least one of the lighting system devices based on the location of the light fixture and the communication link quality between the light fixture and the at least one lighting system device.

5. The method of claim 4, further comprising estimating the location of the at least one lighting system device based on locations of a plurality of lighting fixtures, and link qualities between the at least one lighting system device and each of the plurality of lighting fixtures.

6. The method of claim 3, wherein the one or more lighting system devices comprise one or more gateways, and further comprising discovering the one or more gateways, comprising:
    providing, by the central controller, the one or more gateways with IP addresses;
    determining a location of each of the gateways, comprising each gateway notifying the central controller when the gateway has received a message from at least one light fixture, wherein the message received from the at least one light fixture indicates that the at least one light fixture has received communication from the user, wherein the central controller determines the location of the gateway based on the location of the light fixture.

7. The method of claim 6, wherein if multiple gateways receive the message, a signal quality of the message is used to determine which of the gateways is closest to the at least one light fixture, and therefore determines the location of the gateway that is the closest.

8. The method of claim 1, further comprising sensing, by the light fixture, a presence of a user.

9. The method of claim 1, wherein establishing the communication link comprises the light fixture providing the user with an indicator that the light fixture has received an initial communication from the user.

10. The method of claim 1, wherein establishing the communication link between the fixture and the user comprises the light fixture modulation light emitting from the fixture with information that provides identification of the light fixture.

11. The method of claim 1, wherein the communication is established between the light fixture and the user through an RF signal.

12. The method of claim 1, further comprising the user communicating the location of the light fixture directly to the central controller.

13. The method of claim 1, further comprising the light fixture communicating the location of the light fixture directly to the central controller.

14. The method of claim 1, further comprising a plurality of other light fixtures automatically determining their location based on the location of the light fixture.

15. The method of claim 1, further comprising a plurality of light fixtures, wherein each light fixture automatically establishing communication between the light fixture and the user as the user travels in a structure that includes the plurality of light fixtures, wherein each light fixture automatically determines its location based on the established communication.

16. The method of claim 15, further comprising aiding the location determination of each light fixture based on a map of mapped locations of the plurality of light fixture.

17. A light fixture, comprising:
   a light;
   a controller, wherein the controller is interfaced with the light, wherein the controller is operative to:
      receive a broadcast message from a central controller, wherein reception of the broadcast message puts the light fixture into a known condition;
      establish communication between the light fixture and a user; and
   wherein
   at least one of the controller or the user communicates a location of the user at a time of the established communication, to the central controller, thereby allowing the central controller to record a location of the light fixture.

18. A light system, comprising:
   a plurality of light fixtures; and
   a central controller, wherein the central controller is operable to communicate with each of the plurality of light fixtures; wherein
   each light fixture comprises:
      a light; and
      a controller, wherein the controller is interfaced with the light, wherein the controller is operative to:
         receive a broadcast message from the central controller, wherein reception of the broadcast message puts the light fixture into a known condition;
         establish communication between the light fixture and a user; and wherein
         at least one of the controller or the user communicates a location of the user at a time of the established communication, to the central controller, thereby allowing the central controller to record a location of the light fixture.

19. The system of claim 18, further comprising at least one of the controller or a device controller operative to:
   determine a communication link quality between at least one of the plurality of the light fixtures and one or more lighting system devices, wherein the one or more lighting system devices comprises the device controller.
   estimate a location of at least one of the lighting system devices based on the location of the light fixture and the communication link quality between the light fixture and the at least one lighting system device.

20. The system of claim 19, further comprising estimating the location of the at least one lighting system device based on locations of a plurality of lighting fixtures, and link qualities between the at least one lighting system device and each of the plurality of lighting fixtures.

* * * * *